(12) United States Patent
Redlarski et al.

(10) Patent No.: US 11,530,914 B2
(45) Date of Patent: Dec. 20, 2022

(54) SHAPE MEASURING METHOD

(71) Applicant: MITUTOYO CORPORATION, Kanagawa (JP)

(72) Inventors: Lukasz Redlarski, Eindhoven (NL); Hideyuki Arai, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 16 days.

(21) Appl. No.: 17/386,199

(22) Filed: Jul. 27, 2021

(65) Prior Publication Data

US 2022/0034650 A1 Feb. 3, 2022

(30) Foreign Application Priority Data

Jul. 28, 2020 (JP) .............................. JP2020-127404

(51) Int. Cl.
*G01B 11/25* (2006.01)
*G01B 11/06* (2006.01)
*G02B 13/00* (2006.01)

(52) U.S. Cl.
CPC .......... *G01B 11/2513* (2013.01); *G01B 11/06* (2013.01); *G02B 13/001* (2013.01)

(58) Field of Classification Search
CPC ............................ G01B 11/2513; G01B 11/06
See application file for complete search history.

(56) References Cited

FOREIGN PATENT DOCUMENTS

| JP | 5592763 |    | 9/2014 |             |
|----|---------|----|--------|-------------|
| JP | 5592763 | B2 * | 9/2014 | ......... G01B 11/0608 |
| JP | 6502113 |    | 4/2019 |             |
| JP | 6502113 | B2 * | 4/2019 | ......... G01B 11/0608 |
| JP | 2019060651 | A * | 4/2019 |             |

* cited by examiner

*Primary Examiner* — Rebecca C Bryant
(74) *Attorney, Agent, or Firm* — Greenblum & Bernstein, P.L.C.

(57) ABSTRACT

A shape measuring apparatus applies, to a light beam, a periodic pattern having periodicity in a direction perpendicular to an optical axis and displaceable in the direction perpendicular to the optical axis, relatively displaces a focal point of an objective lens in a direction parallel to the optical axis, and calculates, based on amplitude of intensity of the light beam detected by a photodetector, face shape data on the object to be measured. Then, a top surface measuring step of acquiring face shape data on a top surface of the object to be measured, and a bottom surface measuring step of acquiring face shape data on a bottom surface of the object to be measured by transmitting through the top surface of the object to be measured and aligning the focal point of the objective lens on the bottom surface of the object to be measured are performed.

7 Claims, 15 Drawing Sheets

PROJECTION 1 (0)

PROJECTION 2 (2/3π)

PROJECTION 3 (4/3π)

SHAPE MEASURING METHOD

INCORPORATION BY REFERENCE

This application is based upon and claims the benefit of priority from JP patent application No. 2020-127404, filed on Jul. 28, 2020 (DAS code 397F), the disclosure of which is incorporated herein in its entirety by reference.

BACKGROUND OF THE INVENTION

1. Field of the Invention

The present invention relates to a shape measuring method.

The present invention relates to, for example, a shape measuring method for obtaining the difference between a top surface shape and a bottom surface shape of a light-transmitting object to be measured or shape data on the object to be measured in a thickness direction at an arbitrary position.

2. Description of Related Art

Portable small-sized terminal devices, such as a mobile phone, a smart phone, and a laptop computer, are equipped with a camera, and the camera has been required to have remarkably-high performance.

To improve the performance of a camera requires the accuracy of a lens, and a shape measuring method for inspecting the accuracy of a lens is needed.

SUMMARY OF THE INVENTION

To inspect a lens, a lens surface is scanned or is subjected to point measurement with a contact type probe.

However, the above measurement method has unavoidable technical problems.

The first problem is that when a bottom surface of a lens is to be measured after measuring a top surface of the lens, the lens needs to be flipped (reversed), or a whole measurement apparatus or a probe needs to be moved to face the bottom surface of the lens.

To implement such a configuration, a large-scaled apparatus is needed.

In addition, if the measurement axis (coordinate axis) when the top surface is measured is deviated from the measurement axis (coordinate axis) when the bottom surface is measured, the deviation becomes a measurement error.

The second problem is that since a camera lens has been extremely miniaturized recently, performing shape inspection on such a lens with high accuracy and high resolution with a contact type probe is coming close to the limit.

Note that, as a surface shape measuring method without contacting, JP 5592763 B and JP 6502113 B by the applicant disclose such methods. However, the above first problem remains unsolved, and lens shape measurement still has problems of increase in size of a measuring apparatus and measurement errors caused by deviation from a measurement axis (coordinate axis).

For those reasons, a shape measuring method for calculating the face shapes of a top surface and a bottom surface of, for example, a lens to obtain shape data on an object to be measured in the thickness direction with high accuracy and high throughput.

A purpose of the present invention is to provide a shape measuring method for obtaining shape data on a light-transmitting object to be measured in the thickness direction.

A shape measuring method in an embodiment of the present invention using a shape measuring apparatus including:
a light source;
a periodic pattern applying means for applying, to a light beam from the light source, a periodic pattern having periodicity in a direction perpendicular to an optical axis and displaceable in the direction perpendicular to the optical axis;
an objective lens that irradiates an object to be measured with the light beam to which the periodic pattern is applied;
a focus drive unit that displaces a focal point of the objective lens relatively to the object to be measured in a direction parallel to the optical axis;
a photodetector that detects the light beam reflected by the object to be measured;
a face shape calculation unit that calculates, based on amplitude of intensity of the light beam detected by the photodetector, face shape data on the object to be measured; and
a shape analysis unit that analyzes, from the face shape data calculated by the face shape calculation unit, a shape of the object to be measured, the shape measuring method including:
a top surface measuring step of acquiring, by the shape measuring apparatus, face shape data on a top surface of the object to be measured;
a bottom surface measuring step of acquiring, by the shape measuring apparatus, face shape data on a bottom surface of the object to be measured by transmitting through the top surface of the object to be measured and aligning the focal point of the objective lens on the bottom surface of the object to be measured; and
a shape analyzing step of calculating, based on the top surface shape data acquired in the top surface measuring step and the bottom surface shape data acquired in the bottom surface measuring step, a difference between the top surface shape and the bottom surface shape or shape data on the object to be measured in a thickness direction at an arbitrary position, in which
the object to be measured is a light-transmitting object,
the top surface is a face close to the objective lens, and
the bottom surface is a face far from the objective lens.

In an exemplary embodiment of the present invention, it is preferable that the shape measuring method further includes a first refraction correcting step of performing correction based on a refractive index of the object to be measured when the face shape calculation unit calculates the bottom surface shape in the bottom surface measuring step.

In an exemplary embodiment of the present invention, it is preferable that the shape measuring method further includes a second refraction correcting step of correcting a light refraction amount due to a shape of the top surface of the object to be measured when the face shape calculation unit calculates the bottom surface shape in the bottom surface measuring step.

In an exemplary embodiment of the present invention, it is preferable that the top surface measuring step is performed before the bottom surface measuring step, and the method further includes a second refraction correcting step of correcting, based on a shape of the top surface obtained in the top surface measuring step, a light refraction amount due to the shape of the top surface of the object to be measured when the face shape calculation unit calculates the bottom surface shape.

In an exemplary embodiment of the present invention, it is preferable that the object to be measured is a lens.

In an exemplary embodiment of the present invention, it is preferable that the shape analysis unit performs fitting on at least one of the top surface shape data and the bottom surface shape data to calculate an apex of the lens.

In an exemplary embodiment of the present invention, it is preferable that the shape analysis unit calculates, as a lens thickness, a distance between an apex of a top surface of the lens and an apex of a bottom surface.

BRIEF DESCRIPTION OF THE DRAWINGS

FIG. 8 is a diagram showing that a top surface is being searched for;

FIG. 11 is a diagram showing that a bottom surface is being searched for;

FIG. 14 is a diagram showing that a bottom surface is being searched for; and

DETAILED DESCRIPTION

Figure 1:
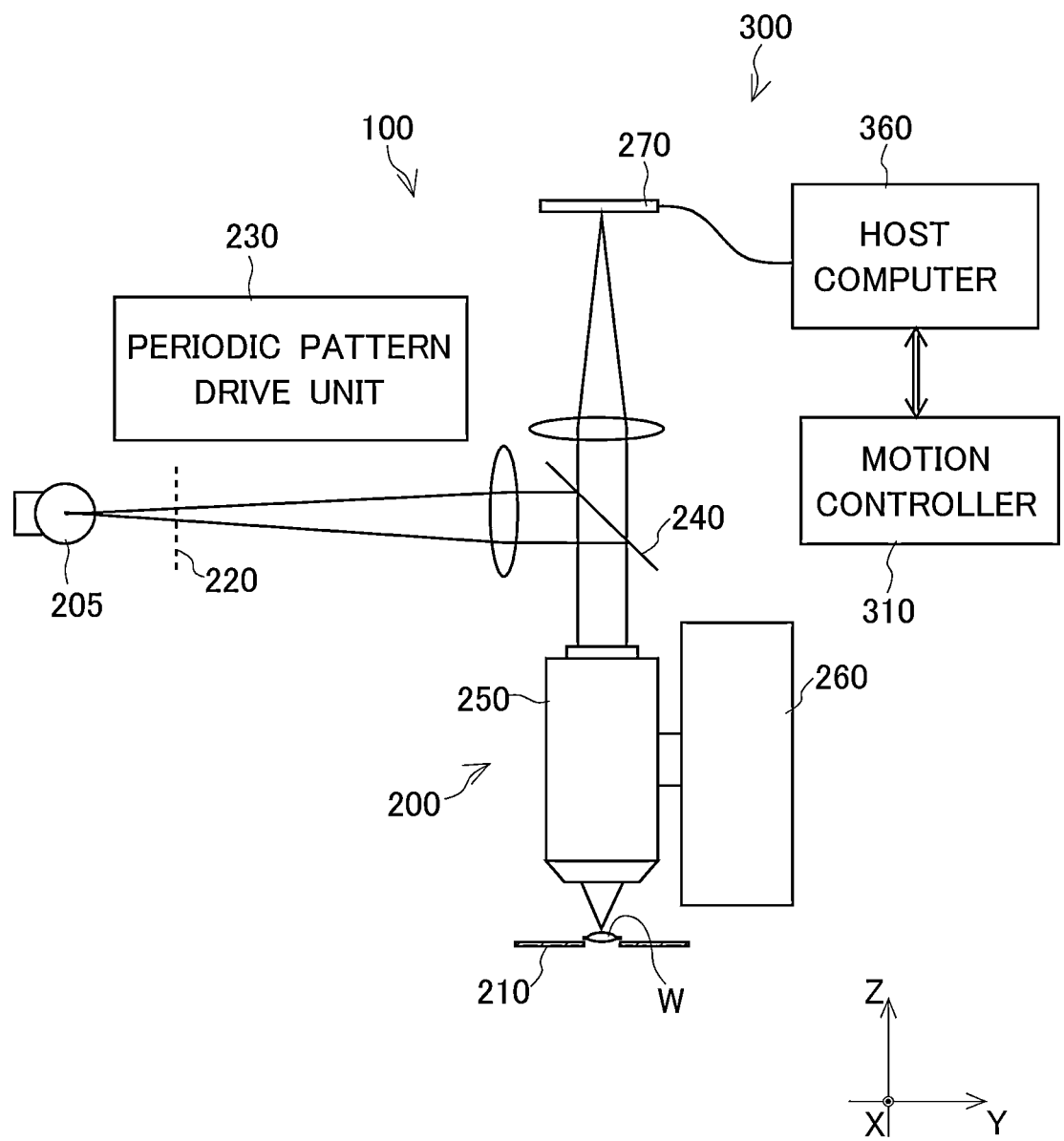
FIG. 1 is a diagram schematically showing a configuration of a shape measuring system according to a first exemplary embodiment.

An exemplary embodiment of the present invention is illustrated and described with reference to reference signs attached to the elements in the drawings.

First Exemplary Embodiment

FIG. 1 is a diagram schematically showing a configuration of a shape measuring system 100 according to a first exemplary embodiment.

The shape measuring system 100 includes a shape measuring apparatus 200 as an optical observation system and a control unit 300 that controls the shape measuring apparatus 200.

In FIG. 1, an object to be measured is a lens W.

First, the lens W as the object to be measured and a stage 210 on which the lens W is to be placed are described.

Figure 2:
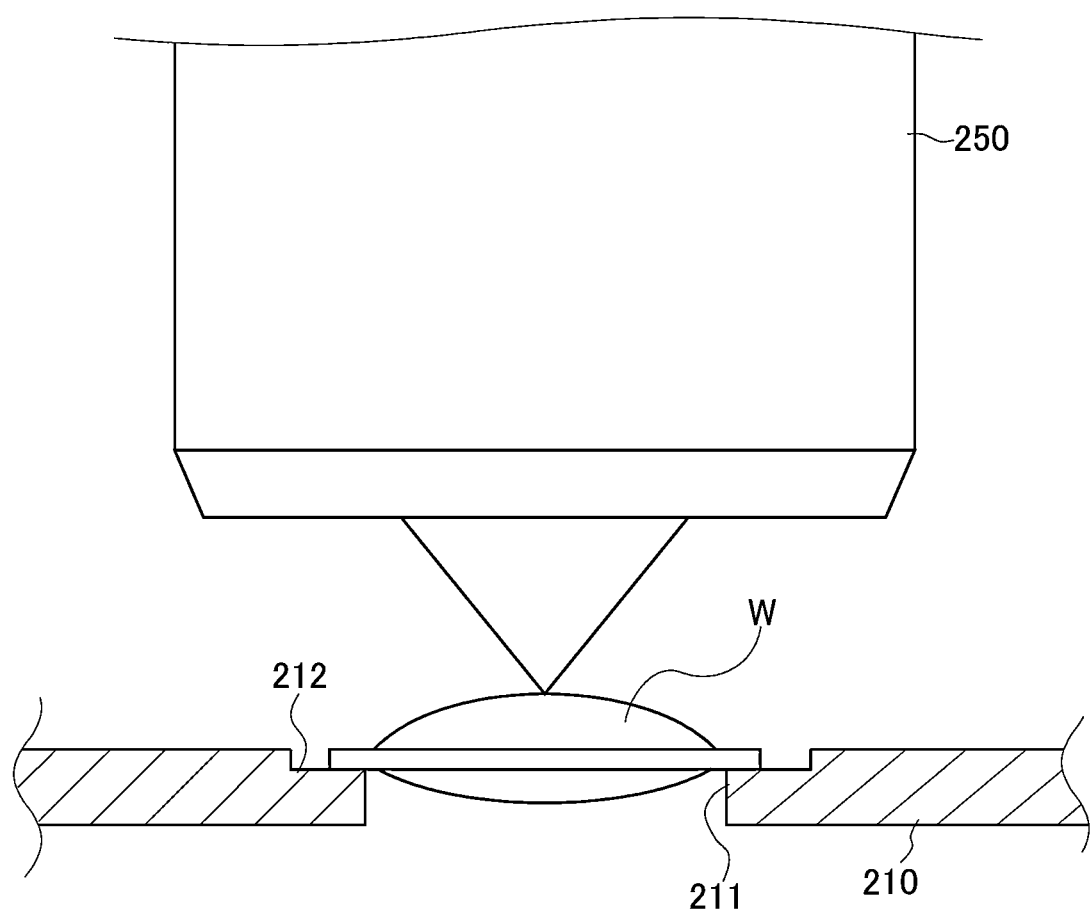
FIG. 2 is a diagram showing a configuration around a stage.

FIG. 2 shows the periphery of the lens W as the object to be measured.

The lens W is a lens for a camera of a portable small-sized terminal device, such as a mobile phone, a smart phone, or a laptop computer, and has a diameter of about 10 mm or less and a thickness of about 500 micrometers. The lens W has a flange part around the lens part, and the flange part is placed on the stage 210. The stage 210 is provided with a hole (referred to as a stage hole 211). The stage hole 211 has a diameter larger than the lens part of the lens W and smaller than the flange part.

In the top surface of the stage 210, a mounting stand face 212 is provided around the stage hole 211 to place the flange part thereon.

The mounting stand face 212 is finished to be a face as perpendicular as possible to the optical axis of the shape measuring apparatus 200. Alternatively, the mounting stand face 212 may be a slope (taper) face (of a cone shape) slightly inclined toward the stage hole 211. Then, when the bottom surface of the flange part is placed on the mounting stand face 212 of the stage 210, the optical axis of the lens W is to be as parallel as possible to the optical axis of the shape measuring apparatus 200.

Note that, it is desirable that the optical axis of the lens W substantially aligns with the optical axis of the shape measuring apparatus 200, but if they are slightly deviated from or inclined to each other, measurement can be performed.

Specifically, as long as the apex (of each of the top surface and the bottom surface) of the lens W is within the view field of an objective lens 250 of the shape measuring apparatus 200, the deviation between the optical axis of the lens W and the optical axis of the shape measuring apparatus 200 is permissible.

(The size of the view field of a microscope is, for example, about 0.3 mm×0.3 mm although it depends on the lens magnification, and it is only required to place the lens W in such a manner that the apex is within the range.)

Returning to FIG. 1, a basic configuration of the shape measuring apparatus 200 and its measurement principle are described.

Note that, the basic configuration of the shape measuring apparatus 200 and its measurement principle are known by JP 5592763 B held by the applicant and the like, but are briefly described below.

The configuration of the shape measuring apparatus 200 is sequentially described along the optical path.

A light beam emitted from a light source 205 first passes through a spatial pattern filter 220 (a periodic pattern applying means), and a periodic pattern is applied to the light beam at this time.

The spatial pattern filter 220 is a periodic pattern having periodicity in one direction and is, for example, a filter having a pattern (grate) like a stripe.

The spatial pattern filter 220 is only required to be any periodic pattern having periodicity and may have, for example, a rectangular wave pattern or a sine wave pattern. When a light beam passes through the spatial pattern filter 220, the stripe pattern is applied to the light beam.

In addition, to the spatial pattern filter 220, a periodic pattern drive unit 230 that displaces the spatial pattern filter 220 in a direction perpendicular to the optical axis is attached. Thus, the spatial pattern filter 220 is movable in the direction perpendicular to the optical axis.

When the spatial pattern filter 220 is moved in the direction perpendicular to the optical axis, the stripe pattern of the light beam is also displaced. That is, the stripe direction of the stripe pattern of the light beam is perpendicular to the optical axis and perpendicular to the moving direction.

Figure 3:
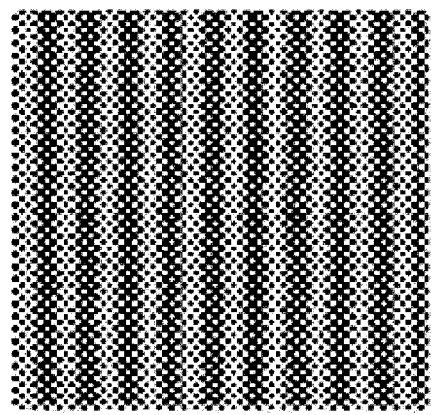
FIG. 3 is a diagram exemplifying images by a spatial pattern filter.
Figure 3:
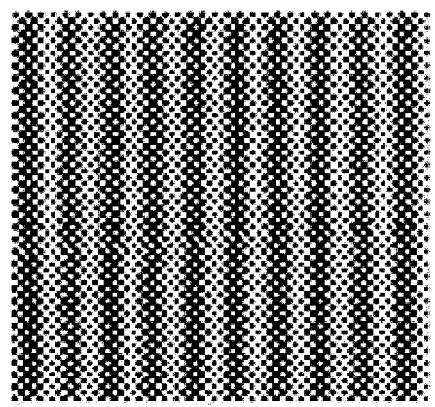
Figure 3:
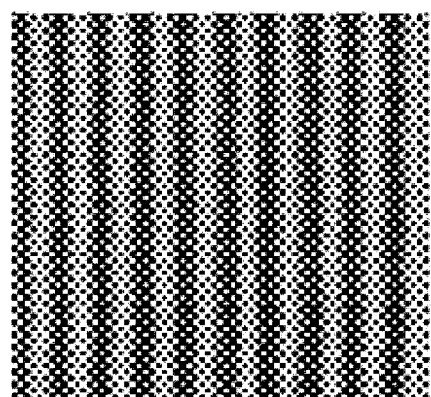

The periodic pattern to be applied to a light beam is exemplified in FIG. 3.

The three patterns shown in FIG. 3 are each shifted by 120° (⅔π) due to the movement of the spatial pattern filter 220.

The light beam to which the periodic pattern is applied passes through the lens, is reflected by a beam splitter 240, and then travels toward the objective lens 250.

With the light beam, the object to be measured (here, the lens W) is irradiated by the objective lens 250.

To the objective lens 250, a focus drive unit 260 that displaces the objective lens 250 along the optical axis is attached.

The step in which the periodic pattern drive unit 230 moves the spatial pattern filter 220 and the step in which the focus drive unit 260 moves the objective lens 250 along the optical axis are performed at the same time in parallel.

Here, it is assumed that while the phase of the periodic pattern is being shifted by moving the spatial pattern filter 220, the focal point (focal plane) is moved by displacing the objective lens 250.

Figure 4:
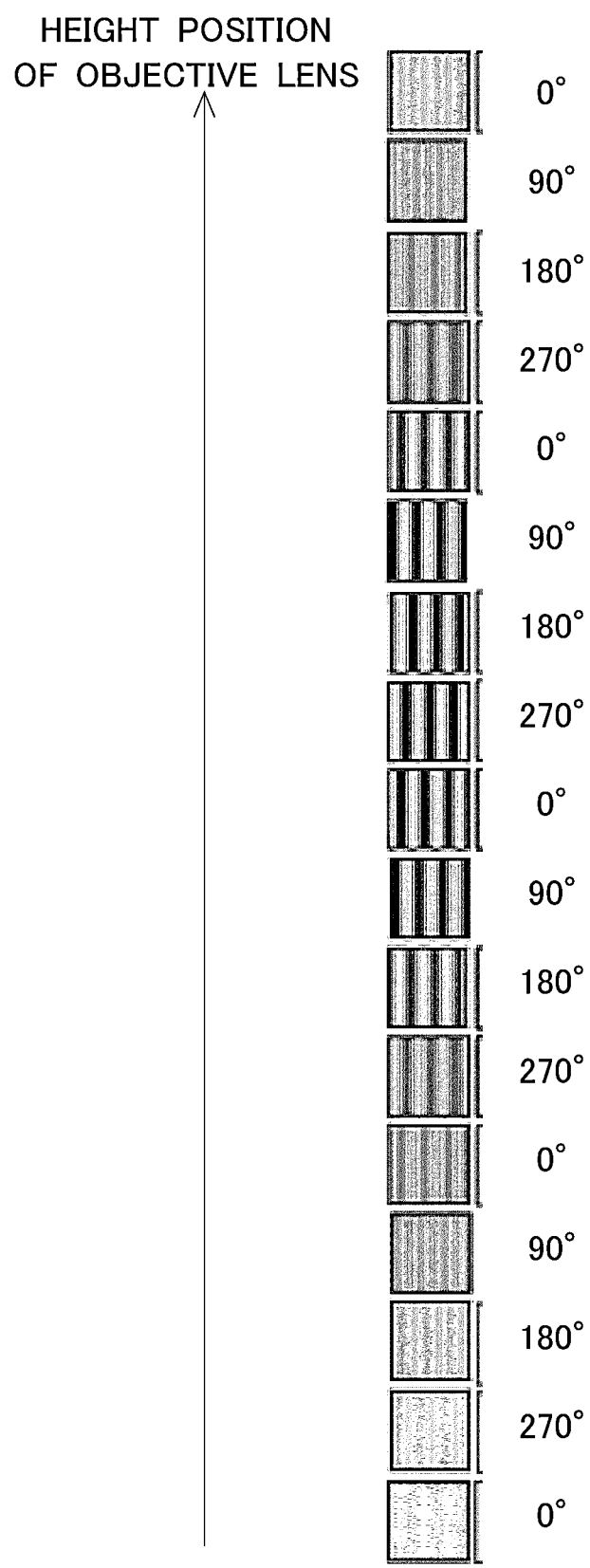
FIG. 4 is a diagram exemplifying images by the spatial pattern filter.

Then, when it is assumed that the reflected light beam from the face to be measured is imaged while the height of the objective lens 250 is being changed, the images are shown in FIG. 4.

FIG. 4 shows that the image (stripe) is clearly seen when the focal point (focal plane) is aligned with the face to be measured, that is, when the face to be measured is in focus.

In contrast, FIG. 4 shows that the image is unclearly seen when the focal point (focal plane) is not aligned with the face to be measured, that is, when the face to be measured is not in focus.

Figure 5:
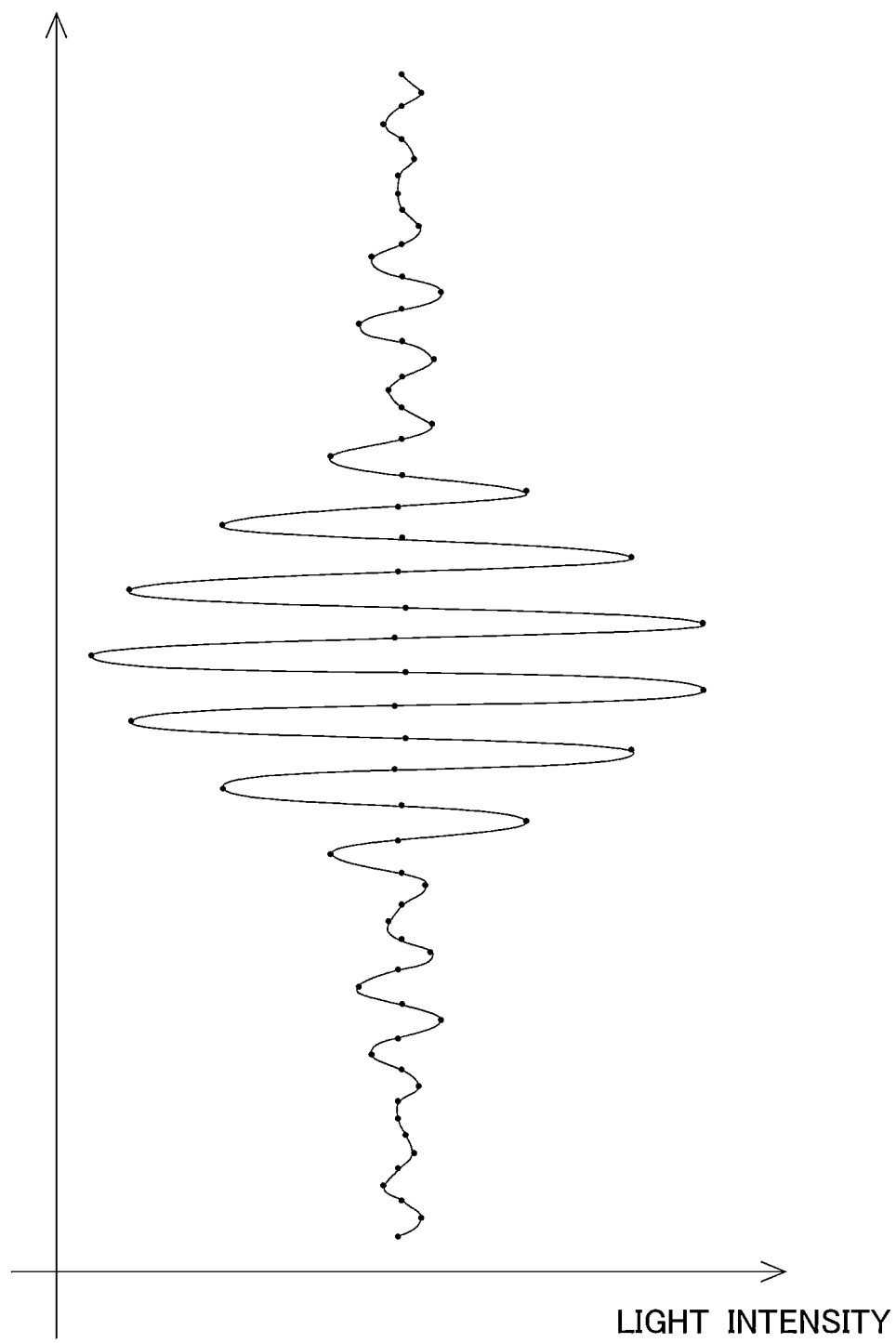
FIG. 5 is a diagram exemplifying the amplitude of light intensity in an image by the spatial pattern filter.

Here, FIG. 5 shows what is obtained by plotting the light intensity at one point (may be interpreted as an arbitrary pixel) in an acquired image against the height of the objective lens 250.

Just before and just after the face to be measured is in focus, the images (stripe) are clearly seen. Then, since the bright-and-dark stripe of the image is laterally shifted gradually, when the light intensity at one point (may be interpreted as an arbitrary pixel) is plotted against the height of the objective lens 250, the deflection becomes large near the height position at which the face to be measured is in focus.

In other words, the point at which the deflection of the light intensity is largest is the height position at which the face to be measured is in focus.

The reflected light beam reflected by the object to be measured (the lens W) passes through the objective lens 250 backward, is transmitted through the beam splitter 240, and enters a photodetector 270.

The photodetector 270 is an element that convers the intensity of the received light beam into an electric signal and is, for example, a (two-dimensional) CCD image sensor or a CMOS image sensor. The electric signal from the photodetector 270 is transmitted to the control unit 300.

Figure 6:
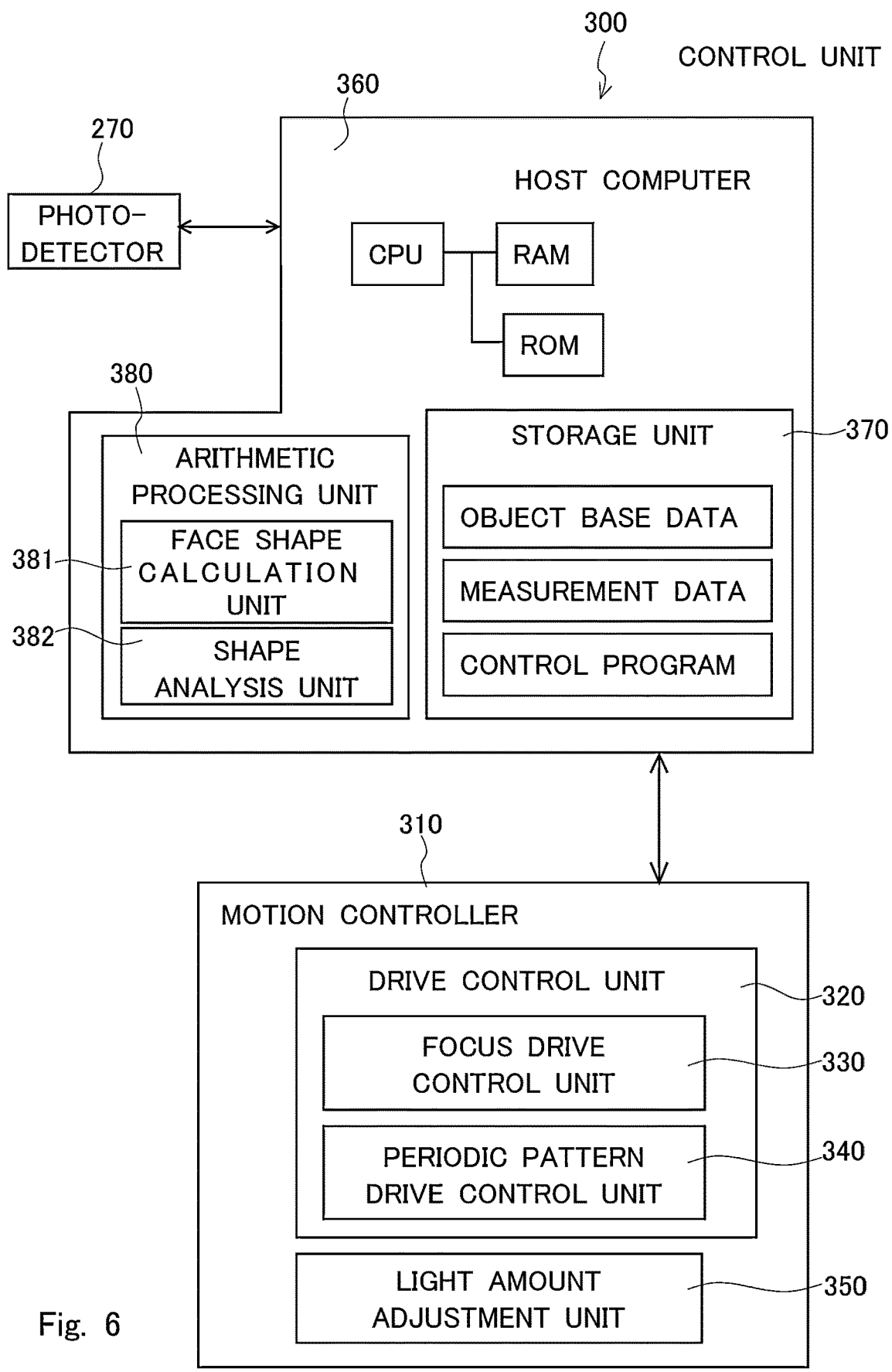
FIG. 6 is a functional block diagram of a control unit 300.

FIG. 6 is a functional block diagram of the control unit 300.

A configuration and operation of the control unit 300 are described.

The control unit 300 includes a motion controller 310 and a host computer 360.

The host computer 360 is connected to output devices (a display and a printer) and input devices (a key board and a mouse) as needed.

The motion controller 310 includes a drive control unit 320 and a light amount adjustment unit 350.

The drive control unit 320 includes a focus drive control unit 330 and a periodic pattern drive control unit 340.

The focus drive control unit 330 provides a drive command to the focus drive unit 260, and the focus drive unit 260 displaces the objective lens 250 along the optical axis in accordance with the drive command.

The periodic pattern drive control unit 340 provides a drive command to the periodic pattern drive unit 230, and the periodic pattern drive unit 230 displaces the spatial pattern filter 220 in the direction perpendicular to the optical axis in accordance with the drive command.

It is preferable that the moving speed of the objective lens 250 and the phase changing speed of the periodic pattern have a predetermined fixed relation (relational expression), and the moving speed of the objective lens 250 and the phase changing speed of the periodic pattern are synchronously controlled with a certain relation.

The most simple and preferable driving method, although this is not essentially required, is that both the moving speed of the objective lens 250 and the moving speed of the spatial pattern filter 220 are to be constant. If the objective lens 250 is set to move relatively slowly and the spatial pattern filter 220 is set to move relatively quickly, the height resolution in the measurement becomes high.

It is needless to say that shorter intervals for sampling the image are better.

The light amount adjustment unit 350 adjusts the light amount of the light source 205.

The host computer 360 includes a central processing unit (CPU) and a memory (a ROM or a RAM), controls the operation of the shape measuring apparatus 200 via the motion controller 310 in accordance with a predetermined measurement control program, and performs arithmetic processing on detection data from the shape measuring apparatus 200 to calculate the shape of the object to be measured (the lens W).

The host computer 360 further includes a storage unit 370 and an arithmetic processing unit 380.

The storage unit 370 stores base data (design data, a curvature, a refractive index, and the like) on the shape of the object to be measured (the lens W), measurement data obtained by measurement, and a measurement control program for controlling entire measurement operation. The CPU executes the measurement control program, whereby measurement operation is performed.

The arithmetic processing unit 380 includes a face shape calculation unit 381 and a shape analysis unit 382.

The processing operation of the face shape calculation unit 381 and the shape analysis unit 382 is described below with reference to a flowchart.

Figure 7:
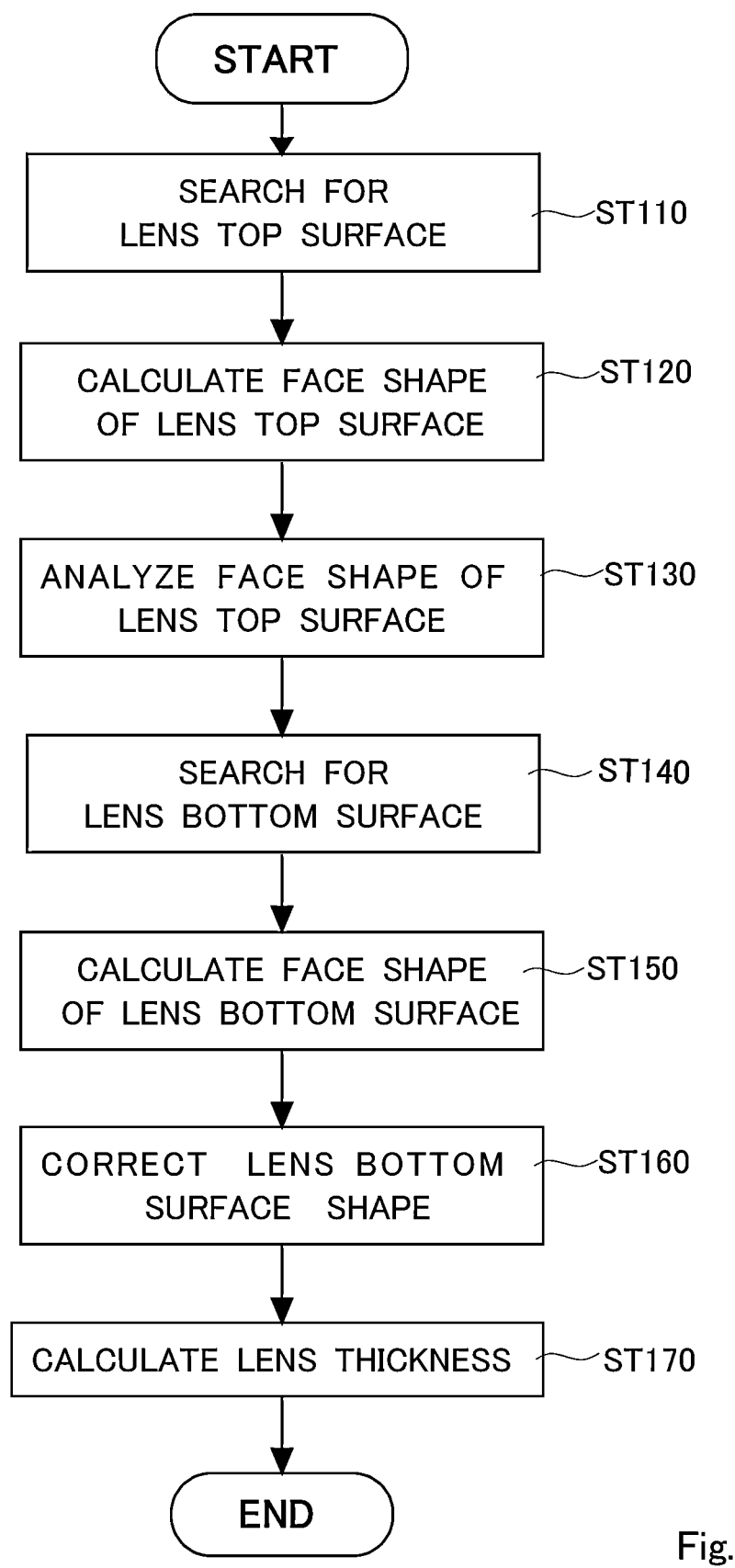
FIG. 7 is a flowchart for explaining motions in a shape measuring method.

FIG. 7 is a flowchart for explaining operation in a shape measuring method according to the present exemplary embodiment.

First, in ST110, the top surface of the lens W is searched for.

Figure 8:
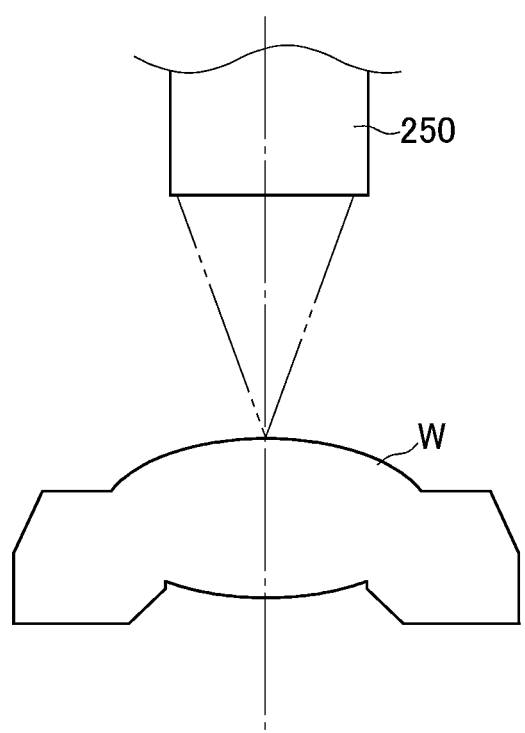

In this step, as described above, while the phase of the periodic pattern is being shifted, the focal point (focal plane) of the objective lens 250 is displaced near the top surface of the lens in parallel to the optical axis (of the objective lens 250), and, at this time, the reflected light beam is received by the photodetector 270 (FIG. 8). Then, in ST120, the face shape of the lens top surface is calculated. This step is performed by the face shape calculation unit 381.

Figure 9:
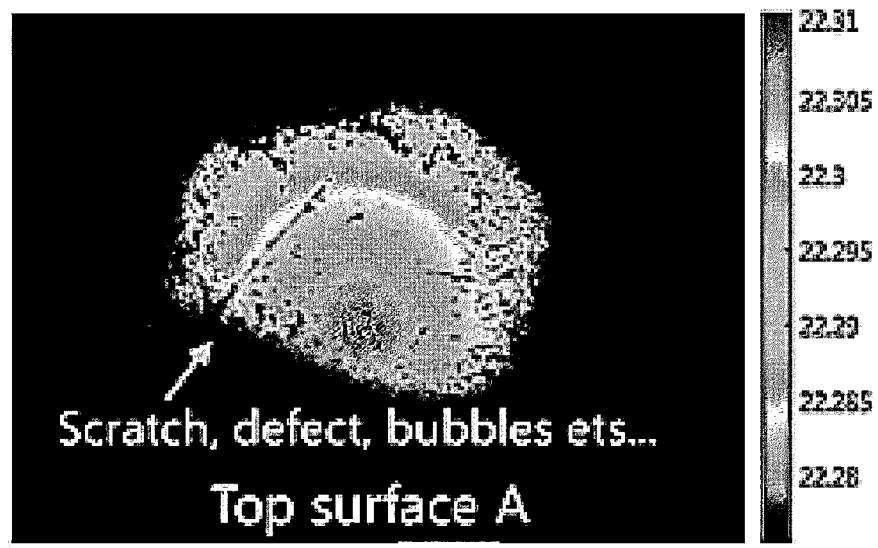
FIG. 9 is a diagram showing an example of a top surface shape obtained by face shape calculation.

The light intensity of the light beam received by the photodetector 270 is plotted against the height of the objective lens 250, and the height position at which the deflection of the light intensity is largest is calculated as the height position at which the face to be measured is in focus. Since the focal length of the objective lens 250 is known, the height (position) of the lens face is determined from the position of the objective lens 250. The result of calculating the lens top surface in this manner is shown as an example in FIG. 9.

By calculating, for each pixel of the two-dimensional photodetector 270, the height position at which the deflection of the light intensity is largest, a height map (a height profile, a contour line profile, a contour line diagram, or a contour map) of the lens surface can be obtained with the accuracy of the resolution level of the photodetector 270.

However, the horizontal resolution (resolving power) of the objective lens 250 has a limit, and arithmetic capacity for performing, for each pixel of the photodetector 270, arithmetic processing, such as Fourier transformation or inverse Fourier transformation, also has a limit. Thus, it is preferable that the height of the lens surface is calculated for each subarea (small area) by performing filtering for combining pixels into four pixels, nine pixels, 25 pixels, or the like depending on the required accuracy.

Next, in ST130, face shape analysis is performed on the calculated face shape of the lens top surface.

This step is performed by the shape analysis unit 382.

In this example, the object to be measured is a lens, and the acquired face shape of the lens top surface is known as a part of a spherical lens (or a part of an aspherical lens). Thus, by performing spherical fitting (or aspherical fitting using a provided design value), the apex position of the lens top surface and a contour line of a concentric circle having the apex as the center are calculated.

Figure 10:
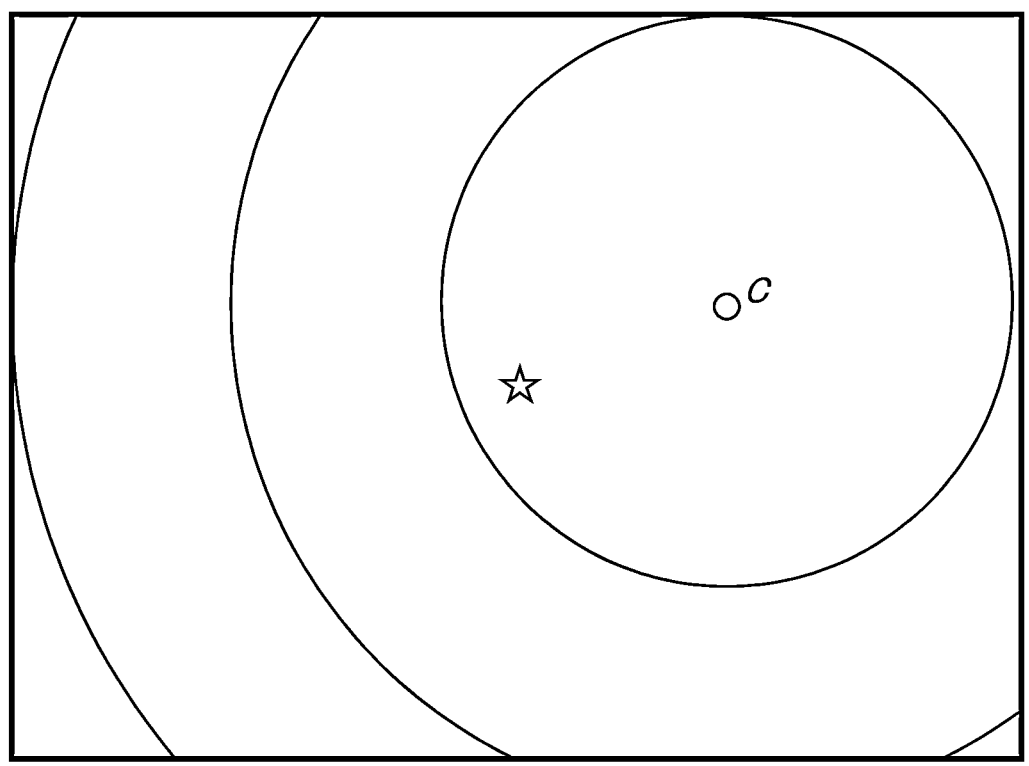
FIG. 10 is a diagram showing an example of a top surface shape obtained by face shape analysis.

FIG. 10 is an example of a result obtained by face shape analysis. The center of the view field is indicated as an asterisk, and the apex position of the lens top surface is indicated as a point C.

Next, the lens bottom surface is measured.

In ST140, the bottom surface of the lens W is searched for.

Figure 11:
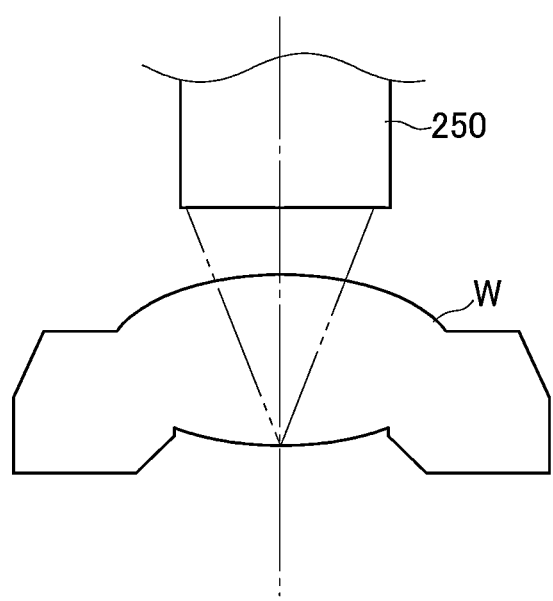

FIG. 11 exemplifies that while the focal point of the objective lens 250 is being moved in the optical axis direction, the bottom surface of the lens W is searched for.

After the lens top surface is measured, while the lens W remains placed on the stage 210, the objective lens 250 is lowered to search for the bottom surface of the lens W. That is, the light beam emitted from the objective lens 250 passes through the lens top surface and is focused on (or near) the lens bottom surface.

In this manner, the measurement light beam passes through the lens top surface and measures the lens bottom surface, and the lens does not need to be flipped (reversed) in order for the lens bottom surface to face upward (to be brought closer to the objective lens 250) when the lens bottom surface is measured.

In addition, in order to measure the lens bottom surface, it is not necessary to prepare a second shape measuring apparatus 200 on the lens bottom surface side.

Note that, a part of the measurement light beam can possibly be reflected by the lens top surface and return to the objective lens 250, but it can be said that stray light has almost no influence on the measurement as compared to the intensity of the reflected light beam when the bottom surface is in focus.

(In the view of the measurement principle of the present exemplary embodiment, the amplitude of the light intensity of the stray light from the top surface rarely fluctuates and can be regarded as being constant, but the amplitude of the intensity of the reflected light beam when the bottom surface is in focus is sufficiently large.)

Based on the reflected light beam from the lens bottom surface, the face shape of the lens bottom surface is calculated (ST150).

This step is performed by the face shape calculation unit 381.

The principle of calculating the lens bottom surface shape from the size of the deflection (amplitude) of the light intensity of the light beam received by the photodetector 270 is the same as the above description, and a repetitive description is omitted.

Figure 12:
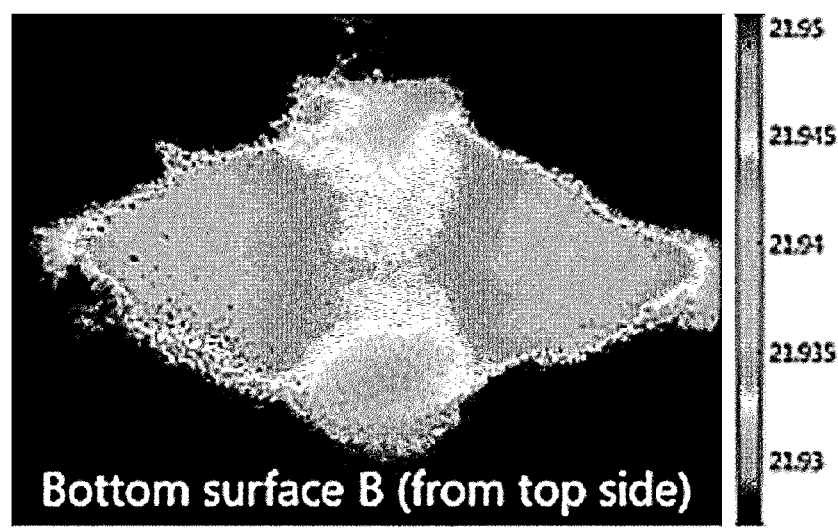
FIG. 12 is a diagram showing an example of a bottom surface shape obtained by face shape calculation.

FIG. 12 shows an example of a result of calculating the face shape (a height map, a height profile, a contour line profile, a contour line diagram, or a contour map) of the lens bottom surface.

In the above steps, the profile of the lens top surface and the profile of the lens bottom surface are already calculated, and by obtaining the difference between the top surface and the bottom surface, the thickness of the object to be measured at each position is calculated.

This shape data analysis processing is performed by the shape analysis unit 382.

Figure 13:
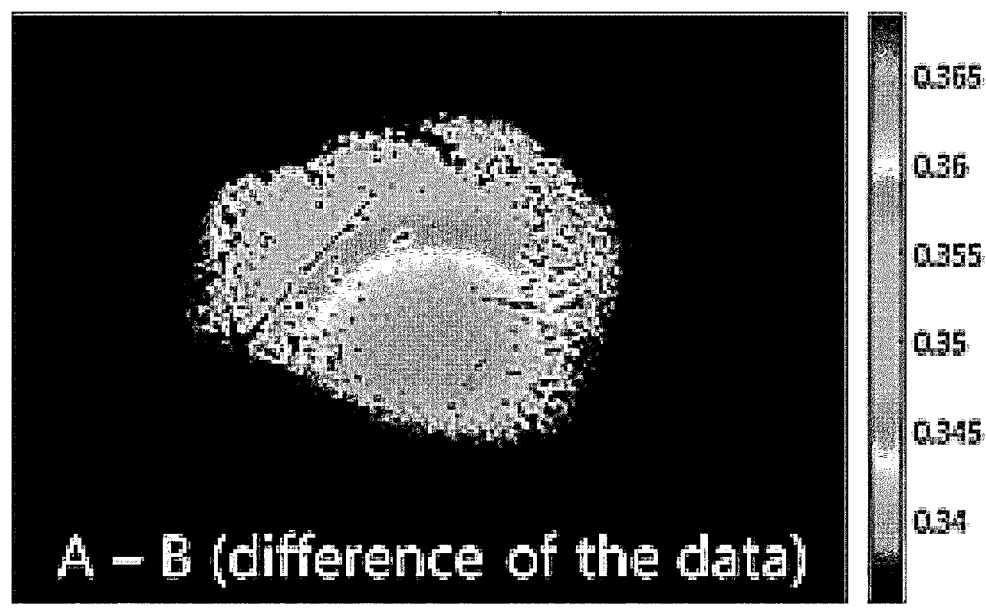
FIG. 13 is a diagram showing an example of a result obtained by subtracting a lens bottom surface profile from a lens top surface profile and calculating the lens thickness at each position.

For example, FIG. 13 shows an example of a result of calculating the lens thickness at each position by subtracting the lens bottom surface profile from the lens top surface profile.

To measure the top surface and the bottom surface, the identical objective lens 250 and the photodetector 270 are used, and the height of the objective lens 250 is just moved along the optical axis without moving the object to be measured. Thus, data position (the position in the horizontal direction) is completely the same between the top surface profile (in ST120) in FIG. 9 and the bottom surface profile (in ST150) in FIG. 12. That is, without the need to perform positioning or the like, by simply obtaining the difference between the top surface and the bottom surface, the thickness of the object can be calculated very accurately. This is an optimum method for evaluating, for example, the thickness of a glass plate, the parallelism between the top and bottom surfaces, or the like.

Here, in order to obtain a more accurate result, it is desirable that the bottom surface shape data is corrected in ST160.

When the bottom surface is measured, the measurement light beam passes through the top surface and travels inside the object to be measured, and the influence of the shape (curvature) of the top surface and the refractive index of the object to be measured itself is included in the optical path of the reflected light beam.

First, because of the influence of the refractive index of the object to be measured (the lens W) itself, a focal length f0 of the objective lens 250 is shortened, and that shortened length needs to be corrected (a first refraction correcting step).

(If a refractive index n2 of the object to be measured is smaller than a refractive index n1 (=1.0) of air, the corrected focal length f' is longer than the focal length f0 of the objective lens 250.)

The refractive index n2 of the object to be measured (the lens W) used to perform correction is obtained from the material of the object to be measured (the lens W).

In addition, the rate of changes (change amount) in the focal length f0 of the objective lens 250 depends on the thickness of the object to be measured (the lens W) through which the measurement light beam passes.

Regarding the thickness of the object to be measured (the lens W) used to perform correction, it can be considered that the thickness of the object to be measured (the lens W) provided as its design value is used.

Taking the focal length f0 of the objective lens 250, the refractive index n2 of the object to be measured (the lens W), and the thickness of the object to be measured (the lens W) as the design value into consideration, when the bottom surface is in focus, the optical path ratio between air and the object to be measured (the lens W) can be calculated from the distance from the objective lens 250 to the focal point.

In addition, it can also be considered that correction is performed on the assumption that the optical path from the objective lens 250 to the focal point is in the object to be measured (the lens W) when the bottom surface is in focus.

Figure 14:
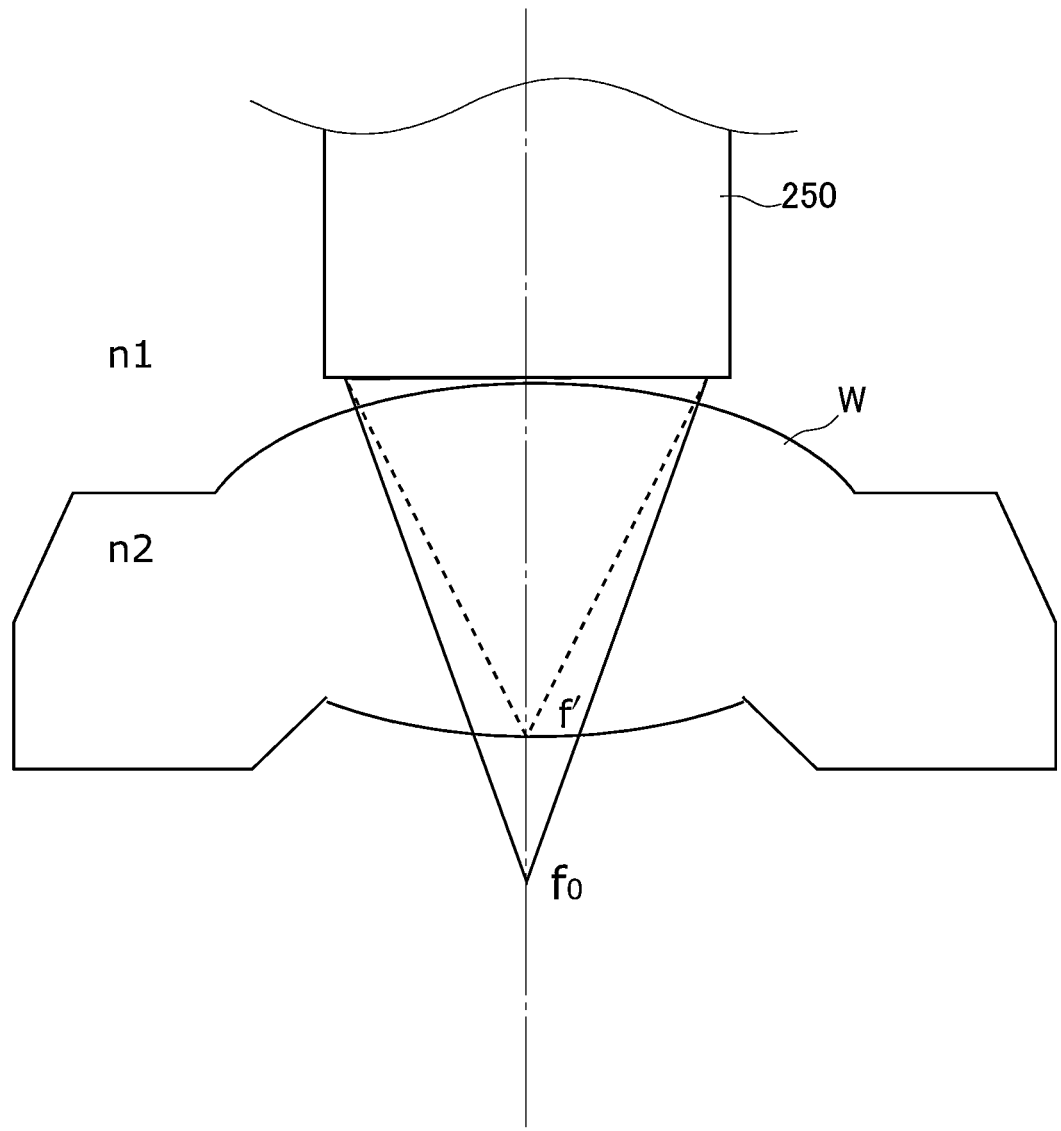

FIG. 14 shows, although exaggerated, that when the bottom surface is in focus, the objective lens 250 is brought closer to the top surface of the object to be measured to an extent capable of considering that the optical path from the objective lens 250 to the focal point is in the object to be measured (the lens W). (Alternatively, it may be considered to use the objective lens 250 having a focal length at which the objective lens 250 is proximal to the top surface of the object to be measured when the bottom surface is measured.)

Next, if the object to be measured is a lens, the optical path is also refracted by the curvature of the top surface of the lens.

The curvature of the top surface of the lens may be provided as a design value of the lens, or if the shape of the top surface of the lens is already calculated, shape data (curvature or the like) obtained from the shape of the top surface of the lens already obtained by measurement may be used to correct the refraction amount (a second refraction correcting step).

FIG. 14 also shows an example of a correction expression.

In this correction expression, ROC is the radius of the top surface shape of a workpiece W and the radius obtained by fitting as described above, or the radius based on the design value (design equation) of the object to be measured (the lens W).

In ST170, if the object to be measured is the lens W, the distance between the apex of the top surface and the apex of the bottom surface is calculated as the lens thickness.

The apex of the top surface has been calculated in fitting (in ST130 in FIG. 10).

The apex of the bottom surface may be calculated by fitting.

Then, the distance between the apex of the top surface and the apex of the bottom surface is calculated as the lens thickness.

Alternatively, it may be considered that lens has the apex of the bottom surface in the center of the view field.

Figure 15:
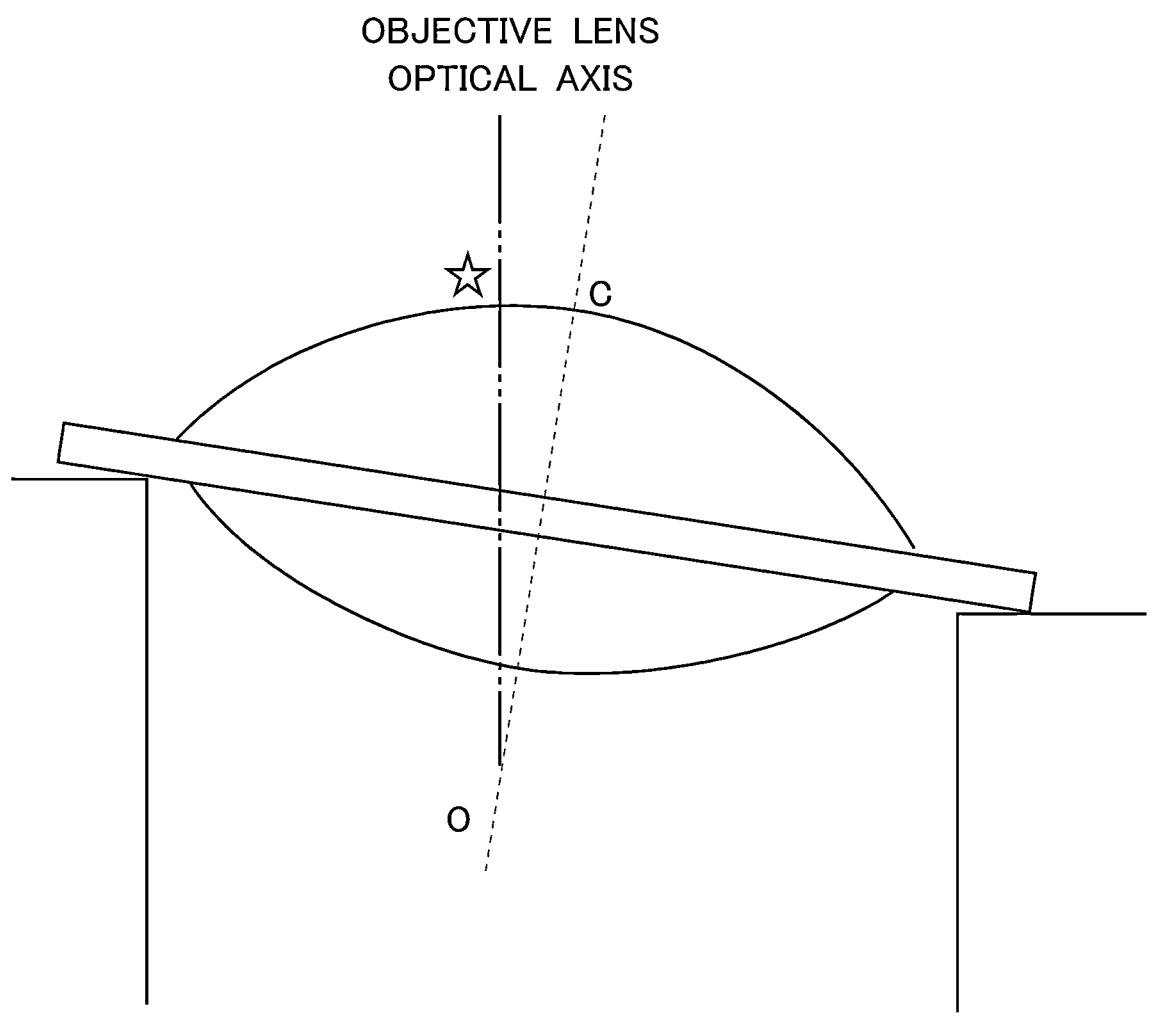
FIG. 15 is a diagram showing that a lens W is placed on a stage while the optical axis is inclined.

FIG. 15 shows, although exaggerated, that the lens W as the object to be measured is placed on the stage 210 while the optical axis of the lens W is being inclined for some reason. In this case, the apex of the top surface of the lens is off the center of the view field due to the inclination of the lens W, but it may be considered that the apex of the bottom surface is substantially at the center of the view field as long as the lens is placed on the center of the stage 210 (the stage hole 211) regardless of the inclination of the lens optical axis.

As described above, with the shape measuring system 100 according to the present exemplary embodiment, it is possible to acquire face shape data on the top surface and the bottom surface of a light-transmitting object to be measured (for example, a lens) to obtain, from the top surface shape data and the bottom surface shape data, shape data on the object to be measured in the thickness direction.

Note that, the present invention is not limited to the above exemplary embodiment and can be appropriately modified without departing from the scope.

As a configuration for applying a periodic pattern to a light beam, in addition to the configuration in which a light beam passes through the movably provided spatial pattern filter 220, various configuration can be employed.

For example, by incorporating a ferroelectric liquid crystal display (FLCoS) or a digital mirror device (DMD) in the optical path, a periodic pattern may be applied to a light beam when the light beam is reflected by the FLCoS or the DMD.

In the description of the above exemplary embodiment, the objective lens 250 and the periodic pattern continue moving without stopping. However, by employing a conventional method, the objective lens 250 may be temporarily stopped, and the periodic pattern (by 90° or 120°) may be shifted while he objective lens 250 is being stopped to obtain a plurality of images having a different phase at each height position of the objective lens 250.

In addition, the periodic pattern is exemplified as a pattern that periodically changes in one direction (for example, a stripe), but a periodic pattern that periodically changes in two directions (for example, a cross grate) or more directions can be used (for example, JP 6502113 discloses such a pattern).

In the above exemplary embodiment, first, a focal point is searched for near the top surface of an object to be measured (for example, the lens W), and height data on the top surface is obtained from the result.

As another focal point searching, a focal point is searched for near the bottom surface of the object to be measured (for example, the lens W), and height data on the bottom surface is obtained from the result.

In principle, it is possible to continuously perform searching from the bottom surface to the top surface of the object to be measured in one stroke.

In this case, the objective lens 250 is only required to be moved in the height direction once, and it is expected to improve the measurement efficiency.

However, in this case, the peak of the amplitude of the light intensity appears twice (for the top surface and the bottom surface).

It is not impossible to calculate the two peak positions by arithmetic processing, such as Fourier transformation or inverse Fourier transformation, but this takes troublesome processing and can slightly deteriorate the accuracy.

Thus, currently, it is preferable that the step of searching for the top surface is separated from the step of searching for the bottom surface.

As shape data on an object to be measured obtained by shape analysis, it is preferable that when the object to be measured is a lens, lens eccentricity is prepared in addition to the above examples.

A line connecting the apex of the curved face of the top surface and the apex of the curved face of the bottom surface is the optical axis.

Meanwhile, it is assumed that a line connecting the center of the contour circle on the top surface side (the center of the top circle) of the lens and the center of the contour circle on the bottom surface side (the center of the bottom circle) of the lens is the center line based on the contour. The shape data on the object to be measured is calculated from the deviation between the optical axis and the center line as lens eccentricity. (Lens eccentricity includes a shift and a tilt.)

If it is difficult to calculate the center line based on the contour of the lens with the above exemplary embodiment alone, the following method may be employed.

By using another shape measuring apparatus (for example, an image measuring apparatus) to obtain shape data by measuring the shape of the lens, the obtained shape data may be used. Alternatively, in the above exemplary embodiment, the stage and the objective lens may be configured to be relatively moved with high accuracy in the lateral direction (the X-axis direction and the Y-axis direction) to measure the diameter of the lens.

100 Shape measuring system
200 Shape measuring apparatus
205 Light source
210 Stage
211 Stage hole
212 Mounting stand face
220 Spatial pattern filter
230 Periodic pattern drive unit
240 Beam splitter
250 Objective lens
260 Focus drive unit
270 Photodetector
300 Control unit
310 Motion controller
320 Drive control unit
330 Focus drive control unit
340 Periodic pattern drive control unit
350 Light amount adjustment unit
360 Host computer
370 Storage unit
380 Arithmetic processing unit
381 Face shape calculation unit
382 Shape analysis unit

The invention claimed is:

1. A shape measuring method using a shape measuring apparatus comprising:
    a light source;
    a periodic pattern applying means for applying, to a light beam from the light source, a periodic pattern having periodicity in a direction perpendicular to an optical axis and displaceable in the direction perpendicular to the optical axis;
    an objective lens configured to irradiate an object to be measured with the light beam to which the periodic pattern is applied;
    a focus drive unit configured to displace a focal point of the objective lens relatively to the object to be measured in a direction parallel to the optical axis;
    a photodetector configured to detect the light beam reflected by the object to be measured;
    a face shape calculation unit configured to calculate, based on amplitude of intensity of the light beam detected by the photodetector, face shape data on the object to be measured; and
    a shape analysis unit configured to analyze, from the face shape data calculated by the face shape calculation unit, a shape of the object to be measured,
    the shape measuring method comprising:
    a top surface measuring step of acquiring, by the shape measuring apparatus, face shape data on a top surface of the object to be measured;
    a bottom surface measuring step of acquiring, by the shape measuring apparatus, face shape data on a bottom surface of the object to be measured by transmitting through the top surface of the object to be measured and aligning the focal point of the objective lens on the bottom surface of the object to be measured; and
    a shape analyzing step of calculating, based on the top surface shape data acquired in the top surface measuring step and the bottom surface shape data acquired in the bottom surface measuring step, a difference between the top surface shape and the bottom surface shape or shape data on the object to be measured in a thickness direction at an arbitrary position, wherein
    the object to be measured is a light-transmitting object, the top surface is a face close to the objective lens, and the bottom surface is a face far from the objective lens.

2. The shape measuring method according to claim 1, further comprises a first refraction correcting step of performing correction based on a refractive index of the object to be measured when the face shape calculation unit calculates the bottom surface shape in the bottom surface measuring step.

3. The shape measuring method according to claim 1, further comprise a second refraction correcting step of correcting a light refraction amount due to a shape of the top surface of the object to be measured when the face shape calculation unit calculates the bottom surface shape in the bottom surface measuring step.

4. The shape measuring method according to claim 1, wherein
    the top surface measuring step is performed before the bottom surface measuring step, and
    the method further comprises a second refraction correcting step of correcting, based on a shape of the top surface obtained in the top surface measuring step, a light refraction amount due to the shape of the top surface of the object to be measured when the face shape calculation unit calculates the bottom surface shape.

5. The shape measuring method according to claim 1, wherein the object to be measured is a lens.

6. The shape measuring method according to claim 5, wherein the shape analysis unit is configured to perform fitting on at least one of the top surface shape data and the bottom surface shape data to calculate an apex of the lens.

7. The shape measuring method according to claim 6, wherein the shape analysis unit is configured to calculate, as a lens thickness, a distance between an apex of a top surface of the lens and an apex of a bottom surface.

* * * * *